(12) United States Patent
Nagatomi et al.

(10) Patent No.: US 10,643,445 B2
(45) Date of Patent: May 5, 2020

(54) IN-CAR STATUS NOTIFICATION SYSTEM

(71) Applicant: Toyota Jidosha Kabushiki Kaisha, Toyota-shi, Aichi-ken (JP)

(72) Inventors: Keiko Nagatomi, Toyota (JP); Noritaka Toyama, Anjo (JP); Atsuko Kobayashi, Nagoya (JP); Keisuke Ito, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/229,780

(22) Filed: Dec. 21, 2018

(65) Prior Publication Data

US 2019/0251818 A1    Aug. 15, 2019

(30) Foreign Application Priority Data

Feb. 9, 2018   (JP) .................. 2018-022445

(51) Int. Cl.

| | |
|---|---|
| *G08B 21/00* | (2006.01) |
| *G08B 21/02* | (2006.01) |
| *G08B 21/24* | (2006.01) |
| *G08B 21/22* | (2006.01) |
| *H04W 4/40* | (2018.01) |
| *G08G 1/00* | (2006.01) |
| *B60N 2/00* | (2006.01) |
| *G08B 25/00* | (2006.01) |

(52) U.S. Cl.
CPC ......... *G08B 21/0205* (2013.01); *G08B 21/22* (2013.01); *G08B 21/24* (2013.01); *G08G 1/20* (2013.01); *H04W 4/40* (2018.02); *B60N 2/002* (2013.01); *G08B 25/005* (2013.01)

(58) Field of Classification Search
CPC ...... G08B 21/0205; G08B 21/22; G08G 1/20; H04W 4/40
USPC ........................................ 340/425.5
See application file for complete search history.

(56) References Cited

U.S. PATENT DOCUMENTS

| | | | |
|---|---|---|---|
| 2013/0021476 A1* | 1/2013 | Trummer ................ | B60R 22/48 348/148 |
| 2013/0044008 A1* | 2/2013 | Gafford .................. | G08G 1/205 340/989 |
| 2014/0253313 A1 | 9/2014 | Schoenberg | |
| 2017/0120813 A1 | 5/2017 | Wilson et al. | |
| 2017/0240110 A1* | 8/2017 | Lopez-Hinojosa ... | H04W 76/10 |

FOREIGN PATENT DOCUMENTS

JP   2006-233499 A   9/2006

* cited by examiner

*Primary Examiner* — Mark S Rushing
(74) *Attorney, Agent, or Firm* — Dinsmore & Shohl LLP

(57) ABSTRACT

An in-car status notification system that detects that a situation requiring attention has arisen in which a child is alone inside an automobile by using at least one of a plurality of sensors or a camera; detects positional information of the automobile; and in cases in which the situation requiring attention has been detected, sends notification of the automobile positional information and situation requiring attention detected information indicating a child is alone in the automobile to at least a pre-set first mobile phone and a pre-set second mobile phone.

12 Claims, 13 Drawing Sheets

IN-CAR STATUS NOTIFICATION SYSTEM

CROSS-REFERENCE TO RELATED APPLICATION

This application is based on and claims priority under 35 USC 119 from Japanese Patent Application No. 2018-022445 filed on Feb. 9, 2018, which is incorporated by reference herein.

BACKGROUND

Technical Field

The present disclosure relates to an in-car status notification system.

Related Art

There is a recent desire to resolve situations in which children are left alone in parked automobiles. There are proposals to notify the driver and related persons that there is a child alone in a vehicle so as to resolve such a situation.

For example, there is a proposal to notify a mobile phone of the owner of an automobile when a child, an elderly person, or the like is inside a vehicle with the doors locked, together with notifying an in-car image (see Japanese Patent Application Laid-Open (JP-A) No. 2006-233499). In this proposal, when the owner has confirmed from the in-car image that an infant, an elderly person suffering from dementia, or the like is inside the vehicle, the owner goes to the automobile, or contacts a service center or the like to dispatch a security staff member or the like, thereby enabling the safety of the infant or elderly person suffering from dementia in the locked vehicle to be secured.

However, the above technology does not address cases in which the automobile doors are not actually locked, and there is also room for improvement in cases in which the owner of the vehicle does not respond swiftly.

SUMMARY

An aspect of the present disclosure is an in-car status notification system, that includes: a memory, and a processor that is configured to: detect that a situation requiring attention has arisen in which a child is alone inside an automobile by using at least one of a plurality of sensors or a camera; detect positional information of the automobile; and in cases in which the situation requiring attention has been detected, send notification of the automobile positional information and situation requiring attention detected information indicating a child is alone in the automobile to at least a pre-set first mobile phone and a pre-set second mobile phone.

BRIEF DESCRIPTION OF THE DRAWINGS

Exemplary embodiments of the present disclosure will be described in detail based on the following figures, wherein.

DETAILED DESCRIPTION

First Exemplary Embodiment

An in-car status notification system according to a first exemplary embodiment of the present disclosure will now be described, with reference to FIG. 1 to FIG. 6. Each of the drawings is merely a schematic representation, and elements having a low relationship to the present exemplary embodiment are omitted from illustration. Note that "child" in the present exemplary embodiment envisages, for example, a preschool infant (e.g. 6 years of age or younger).

Configuration

Figure 1:
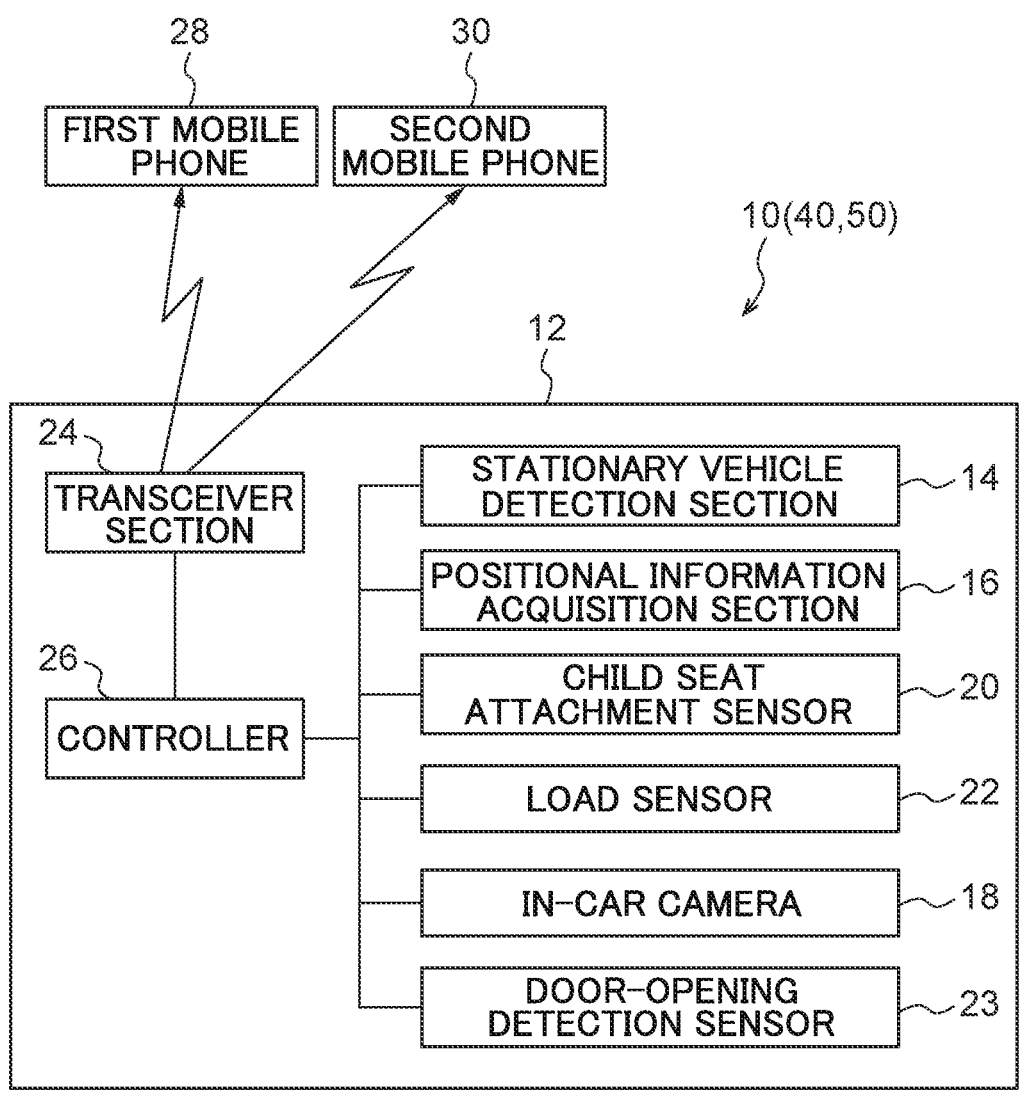
FIG. 1 is a block diagram illustrating an in-car status notification system according to a first exemplary embodiment.

As illustrated in FIG. 1, an in-car status notification system 10 according to the present exemplary embodiment includes, within an automobile 12, a stationary vehicle detection section 14 configured to detect whether or not the automobile 12 is stationary, a positional information acquisition section 16 configured with an antenna 16A or the like to receive positional information from a global positioning system (GPS), an in-car camera 18 configured to image the inside of a vehicle cabin, a child seat attachment sensor 20 configured to detect that a child seat has been attached to a vehicle seat, load sensors 22 configured to detect load of each seat, door-opening detection sensors 23 configured to detect opening of each door of the automobile 12, and a transceiver section 24 configured to transmit and receive data to and from devices outside the automobile 12.

Figure 13:
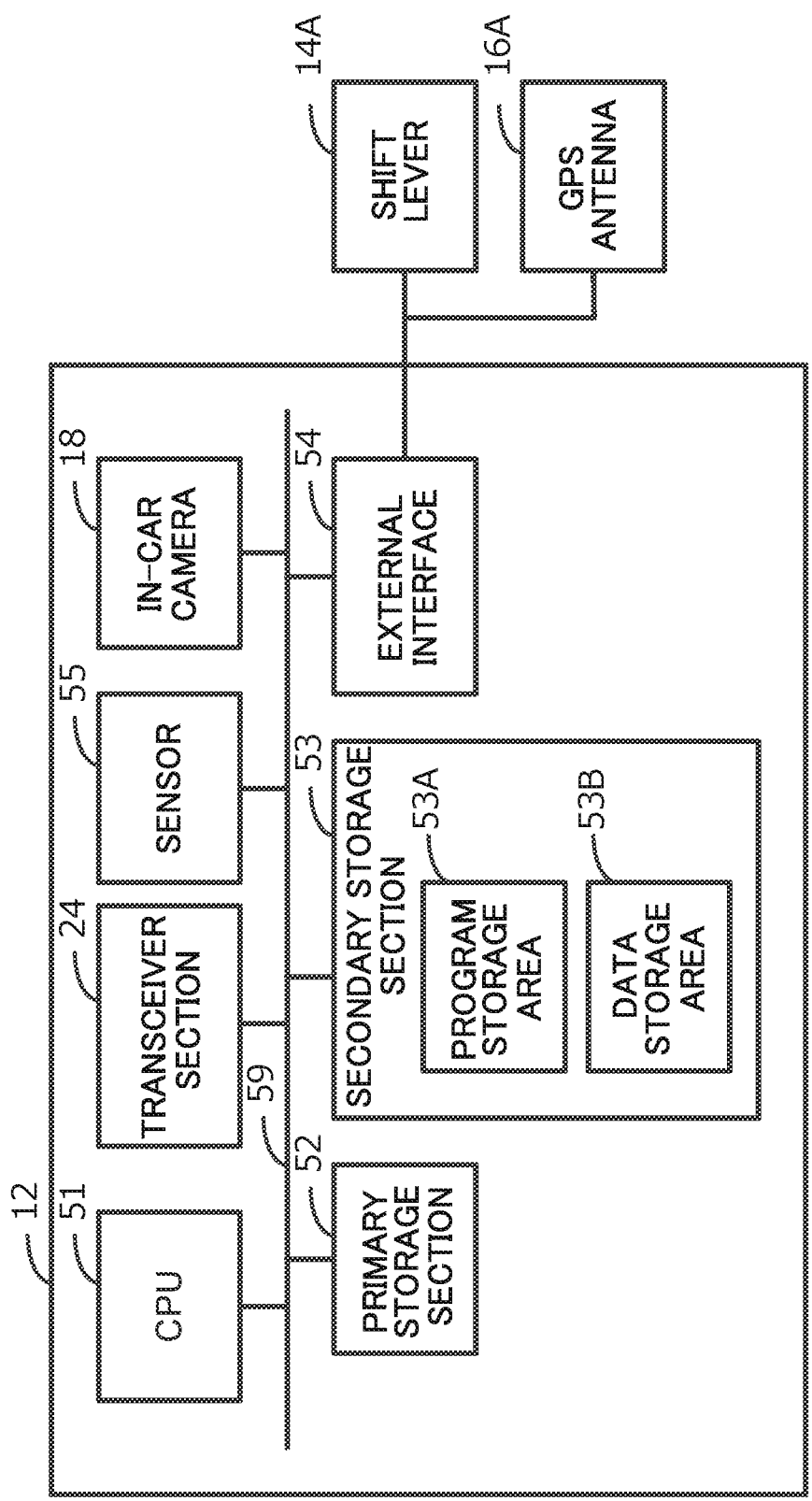
FIG. 13 is a block diagram illustrating an example of a hardware con Figuration of an in-car status notification system.

FIG. 13 illustrates an example of a hardware configuration for the in-car status notification system 10. The in-car status notification system 10 is configured by hardware including a central processing unit (CPU) 51 serving as an example of a processor, a primary storage section 52, a secondary storage section 53, an external interface 54, sensors 55, and the in-car camera 18. The sensors 55 include, for example, the child seat attachment sensor 20, the load sensors 22, the in-car camera 18 and the door-opening detection sensors 23 of FIG. 1.

The CPU 51, the primary storage section 52, the secondary storage section 53, and the external interface 54 are connected to each other through a bus 59. The CPU 51, the primary storage section 52, the secondary storage section 53, and the external interface 54 may be contained in an electronic control unit (ECU).

The primary storage section 52 is volatile memory such as random access memory (RAM), for example. The secondary storage section 53 is non-volatile memory such as read only memory (ROM), a hard disk drive (HDD), or a solid state drive (SSD), for example.

The secondary storage section 53 includes a program storage area 53A and a data storage area 53B. The program storage area 53A stores, for example, a program such as an in-car status notification program to cause the execution of in-car status notification processing in the CPU 51. The data storage area 53B stores data acquired by the sensors 55 and the in-car camera 18, temporary intermediate data generated by the in-car status notification processing, and the like.

The CPU 51 reads the in-car status notification program from the program storage area 53A and expands the program in the primary storage section 52. The CPU 51 loads the in-car status notification program, and, by executing the in-car status notification program, the CPU 51 operates as a controller 26, the stationary vehicle detection section 14, and the positional information acquisition section 16 of FIG. 1. Note that programs such as the in-car status notification program may be stored on a non-temporary recording medium such as a digital versatile disk (DVD), and then read by a recording medium reading device and expanded in the primary storage section 52.

The external interface 54 is connected to external devices. The external interface 54 transmits and receives various information between the external devices and the CPU 51. For example, the in-car status notification system 10 is connected to a shift lever 14A and to a GPS antenna 16A through the external interface 54.

Note that instead of being installed in the in-car status notification system 10, the sensors 55 and the in-car camera 18 may, for example, be externally attached through the external interface 54.

The controller 26 of FIG. 1 is configured to determine whether or not there is a child alone in the vehicle (sometimes referred to below as a "situation requiring attention") by pattern matching internally stored image patterns of children alone, against image data of the in-car camera 18.

Or, the controller 26 may be configured to determine that a child is alone in the vehicle in cases in which it has been determined, from an attachment detection signal from the child seat attachment sensor 20 and the load detected from this seat, that although there is there is a load equivalent to a child seat and a child, there is no load detected in the other vehicle seats equivalent to the weight of an adult.

The in-car camera 18 and the controller 26, or the child seat attachment sensor 20, the load sensors 22, and the controller 26, correspond to the "situation requiring attention detection section".

The stationary vehicle detection section 14 is configured to, for example, output a detection signal to the controller 26 when input with a signal when the shift lever 14A of the automobile has been put into either neutral or parking. The controller 26 is configured to use the detection signal to determine the automobile 12 as being stationary.

The positional information acquisition section 16 receives coordinate data from GPS satellites, and the controller 26 is configured to detect the current position of the automobile 12 based on this coordinate data. The positional information acquisition section 16 and the controller 26 correspond to a "positional information detection section".

The transceiver section 24 is configured so as to be capable of external transmission of predetermined data, such as to a mobile phone. Note that the controller 26 is pre-stored with transmission destinations (a first mobile phone 28 and a second mobile phone 30). The controller 26 is configured to notify a predetermined message to the first mobile phone 28 and the second mobile phone 30 when a situation requiring attention, as described later, has been detected. The first mobile phone 28 is, for example, presumed to be the mobile phone of the main driver of the automobile 12, and the second mobile phone 30 is presumed to be the mobile phone of a relative or the like of this driver. The transceiver section 24 and the controller 26 correspond to a "notification section".

Operation and Advantageous Effects

The operation and advantageous effects of the in-car status notification system 10 configured as described above will now be described.

Concerning the controller 26, the stationary vehicle detection section 14 detects that the shift lever 14A of the automobile has been placed in neutral or parking, and outputs a stationary detection signal to the controller 26. When input with the stationary detection signal, the controller 26 determines the automobile 12 to be stationary (step S10=YES).

The controller 26 then determines whether or not there is a situation requiring attention by pattern matching image data of the in-car camera 18 against image patterns of children alone in vehicles (step S12).

Or, the controller 26 determines whether or not there is a child alone in the vehicle based on whether or not an attachment detection signal has been input from the child seat attachment sensor 20, and based on detection values input from the load sensors 22 provided to each of the vehicle seats of the automobile 12. Namely, the controller 26 determines there to be a situation requiring attention in cases in which a child is determined to be in the child seat when the controller 26 has been input with the attachment detection signal from the child seat attachment sensor 20 and the detected load of the vehicle seat installed with the child seat is a load equivalent to the total weight of a child and the child seat, but there is no load detected in the other vehicle seats equivalent to that of an adult (step S12).

When determined that there is a situation requiring attention (step S12=YES), the controller 26 repeats the processing to detect a situation requiring attention until a first predetermined period of time has elapsed from the point in time the initial determination of the situation requiring attention was made (step S14=NO, step S12=YES).

This is performed in order to avoid the hassle that would arise if the mobile phones were notified when the driver was only away from the automobile for a short time, such as to go to the toilet. The processing is accordingly ended when resolution of the situation requiring attention has been detected within the first predetermined period of time (step S12=NO).

In cases in which the situation requiring attention has not been resolved even though the first predetermined period of time from initial detection of the situation requiring attention has elapsed (step S14=YES), the controller 26 transmits situation requiring attention detected information (a warning email, for example) and vehicle positional information (a map showing the vehicle position, for example) from the transceiver section 24 to the first mobile phone 28 (step S16). Explanation follows regarding cases in which a warning email with map attachment (referred to below as "warning email etc.") is transmitted.

A warning message and a map showing the vehicle position is displayed to the owner of the first mobile phone 28 when the owner opens the warning email. Possible text for the warning email includes, for example, "Danger! There is a child alone in your vehicle". The reason the map is also transmitted is to enable the owner of the first mobile phone 28 to respond even in cases in the driver of the automobile 12 is not the owner of the first mobile phone 28.

The controller 26 checks whether or not the situation requiring attention has been resolved while a second predetermined period of time from when the warning email etc. was transmitted to the first mobile phone 28 elapses (step S18, step S20=NO). This is performed so that notification is not sent to the second mobile phone 30, as described later, in cases in which the owner of the first mobile phone 28 (e.g. the driver of the automobile 12) is aware of the situation requiring attention due to notification to the first mobile phone 28, and has taken appropriate action.

The controller 26 determines that the in-car situation requiring attention has been resolved (sometimes referred to below as "resolution of situation requiring attention" and ends processing in cases in which, for example, the detection signals from the door-opening detection sensors 23 and the pattern matching against the image data of the in-car camera 18 have indicated that there is no one inside the vehicle, or that there is both an adult and a child inside the vehicle (step S18=YES). Namely, the situation requiring attention is determined to have been resolved and the processing is ended when the owner of the first mobile phone or a third party contacted by the owner has opened a door and taken the child out from inside the automobile, or there is an adult and a child together in the vehicle.

However, the controller 26 transmits a warning email etc. from the transceiver section 24 to the second mobile phone 30 (step S22) in cases in which the second predetermined period of time has elapsed since transmission (notification) of the warning email to the first mobile phone 28 without resolution of the situation requiring attention.

The owner of the second mobile phone 30 is presumed to be a relative or friend of the owner of the first mobile phone 28 ("Mr. A", who is the most frequent driver of the automobile 12). The warning message and the map showing the vehicle position is displayed to the owner of the second mobile phone 30 when the owner opens the warning email. A possible warning message is, for example, a message something like "Danger! There is a child alone in Mr. A's automobile xxxxxx (this being the license plate number of the vehicle registration certificate for the automobile 12)". The owner of the second mobile phone 30, or a third party contacted by the owner of the second mobile phone 30, is able to respond due to the vehicle positional information also being transmitted therewith.

In this manner, the in-car status notification system 10 according to the present exemplary embodiment first transmits the warning email and the automobile positional information to the first mobile phone 28 when the situation requiring attention has been detected for the automobile 12 (step S16). Then the warning email and the automobile automobile positional information is later transmitted to a different mobile phone to the first mobile phone 28, i.e. to the second mobile phone 30 (step S22). Due to transmitting the warning email and the positional information of the automobile 12 to different mobile phones (e.g. to the first mobile phone 28 and to the second mobile phone 30), even if, for example, the owner of one mobile phone, e.g. the owner of the first mobile phone 28, is unable to respond due to having no battery left in the first mobile phone 28, there is still a high probability of swift resolution of the situation requiring attention due to the owner of the other mobile phone, e.g. the owner of the second mobile phone 30, being able to respond.

Moreover, the configuration aims to achieve a swift resolution of the situation requiring attention by transmitting the warning email first to the first mobile phone 28 that is owned by the person who is most likely to be the driver and is accordingly thought to be in a position closest to the automobile 12.

Moreover, due to the positional information of the automobile 12 (such as a map) being appended to the situation requiring attention detected information (such as the warning email), the owner of the second mobile phone 30 who is not the driver or a third party also knows the accurate stationary position of the automobile 12, enabling a swift response thereto.

In the in-car status notification system 10, the warning email etc. is moreover not notified to the first mobile phone 28 until the first predetermined period of time since initial detection of the situation requiring attention has elapsed (step S12, step S14=NO). This prevents the hassle that would arise if the warning email etc. was notified to the first mobile phone 28 in situations in which the driver of the automobile 12 is only away from the automobile 12 for an extremely short period of time, such as to buy a drink, or to go to the toilet.

Similarly, in the in-car status notification system 10, the warning email etc. is not notified to the second mobile phone 30 until the second predetermined period of time since transmission of the warning email to the first mobile phone 28 has elapsed (step S18, step S20=NO). This configuration is adopted since the transmission of the warning email etc. to the second mobile phone 30 is not required in cases in which the owner of the first mobile phone 28 has responded after receiving the warning email (by returning to the automobile 12, opening a vehicle door, and taking the child out from the vehicle, or by an adult staying in the vehicle together with the child), and thereby resolved the situation requiring attention.

Note that the processing of the in-car status notification processing may, for example, be ended when the situation requiring attention has not been detected for a specific period of time from when the automobile 12 became stationary. This processing may also be started (re-started) at a timing when the opening of a vehicle door has been detected by the door-opening detection sensors.

First Variation

Figure 3:
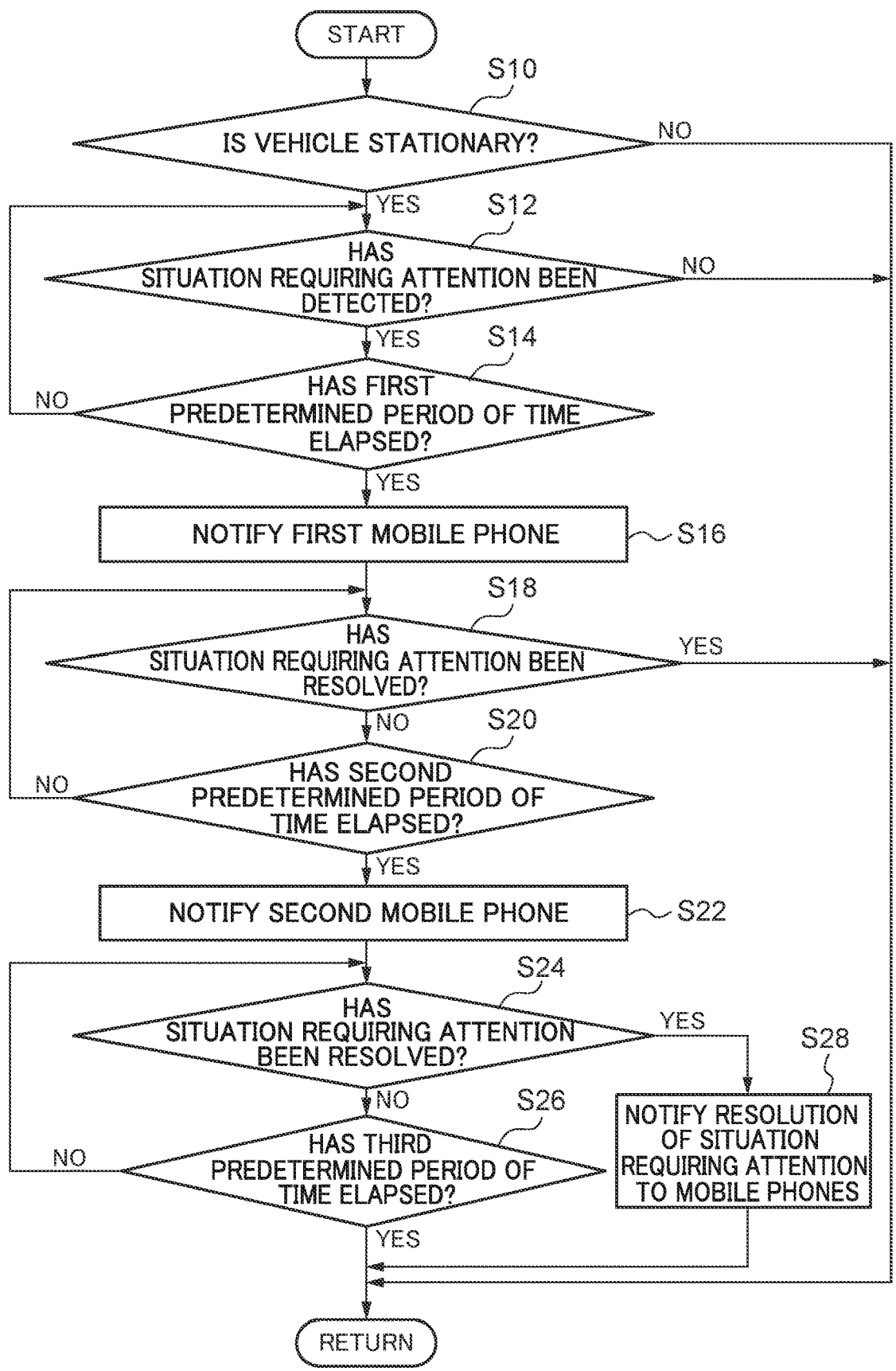
FIG. 3 is a flowchart illustrating in-car status notification processing in an in-car status notification system according to a first variation of the first exemplary embodiment.

A description follows regarding an in-car status notification system 40 according to a first variation of the first exemplary embodiment, with reference to FIG. 1 and FIG. 3. The configuration of the in-car status notification system 40 is exactly the same as that of the in-car status notification system 10, except for additional processing in the flowchart after the warning email etc. has been transmitted to the second mobile phone 30. Configuration elements similar to those of the first exemplary embodiment are appended with the same reference numerals, and detailed explanation thereof will be omitted.

As illustrated in FIG. 3, the controller 26 checks whether or not the situation requiring attention has been resolved (step S24=NO, step S26=NO) during the passage of a third predetermined period of time since the warning email was transmitted to the second mobile phone 30 (step S24).

The controller 26 transmits a resolution notification email from the transceiver section 24 to the first mobile phone 28 and to the second mobile phone 30 (step S28) notifying that the situation requiring attention has been resolved in cases in which the resolution of the situation requiring attention has been confirmed before the third predetermined period of time has elapsed (i.e. when step S24=YES).

Such a configuration is adopted in order to prevent unnecessary attempts by the owner of the first mobile phone 28 to deal with the situation in cases in which the owner of the second mobile phone 30 (e.g. a relative of the driver of the automobile 12) has been made aware of the situation requiring attention in the automobile 12 by the warning email notified to the second mobile phone 30 and already dealt with the situation. This also enables unnecessary attempts by the owner of the second mobile phone 30 to deal with the situation requiring attention to be prevented in cases in which the owner of the first mobile phone 28 has already resolved the situation requiring attention.

Note that the processing is ended in cases in which the third predetermined period of time has elapsed without resolution of the situation requiring attention (step S24=NO, step S26=YES).

In cases in which the child alone situation has been resolved by either the owner of the first mobile phone 28 or the second mobile phone 30, the resolution notification email may be transmitted just to the mobile phone of the owner who did not contribute to resolving the situation. For example, a wireless transceivable range may be set to an extremely narrow range at the periphery of the automobile 12, and the resolution notification email transmitted to just the other mobile phone that was not the mobile phone that entered this range. This enables the avoidance of the confusion that might arise if the resolution notification email was transmitted to the person who actually resolved the situation requiring attention.

Second Variation

Figure 4:
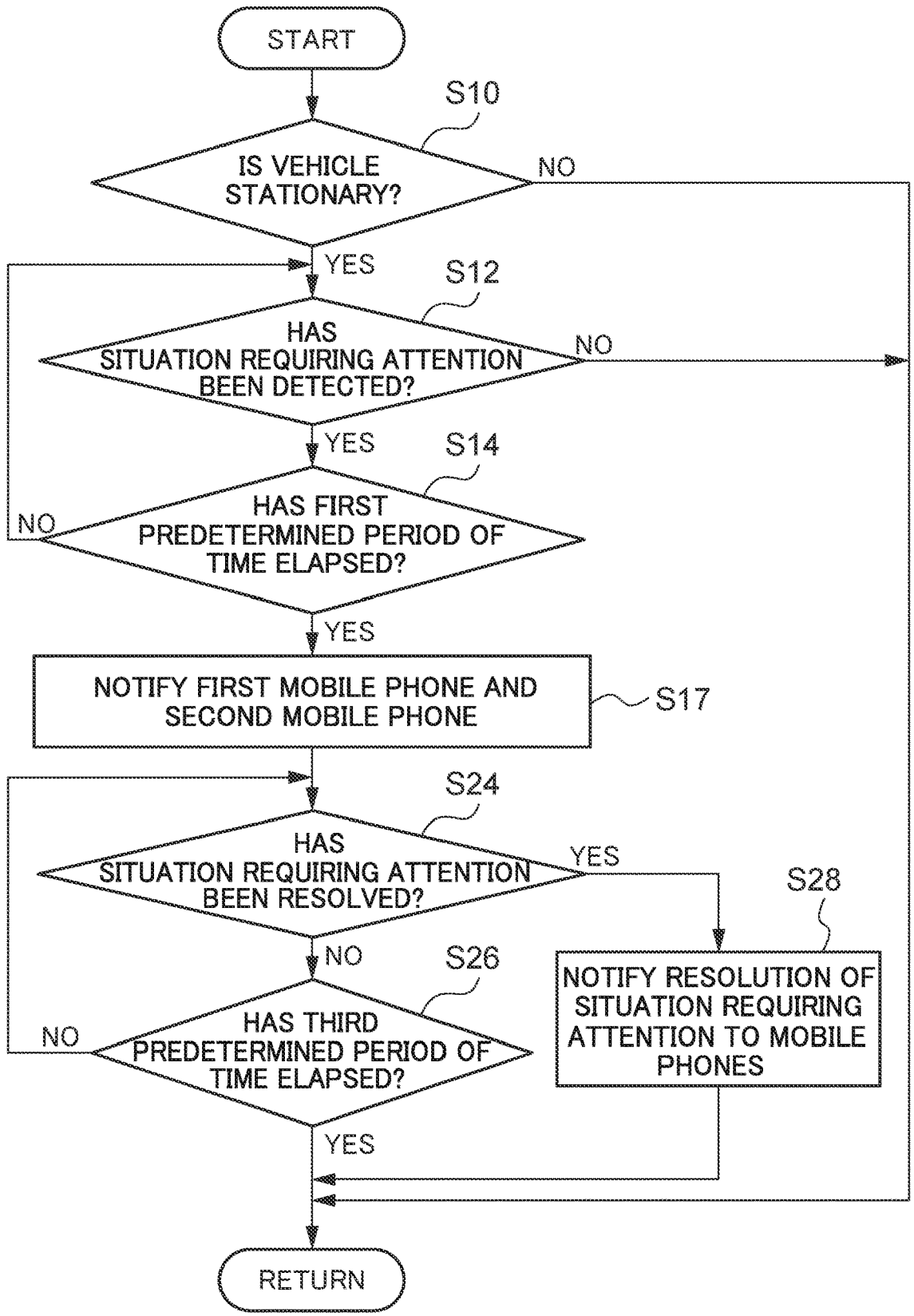
FIG. 4 is a flowchart illustrating in-car status notification processing in an in-car status notification system according to a second variation of the first exemplary embodiment.

An in-car status notification system 50 according to a second variation of the first exemplary embodiment will now be described, with reference to FIG. 1 and FIG. 4. The configuration of the in-car status notification system 50 is exactly the same as that of the in-car status notification system 10, except in that the warning email is transmitted to both the first mobile phone 28 and the second mobile phone 30 at the same time. Configuration elements similar to those of the first exemplary embodiment and the first variation of the first exemplary embodiment are appended with the same reference numerals, and detailed explanation thereof will be omitted.

The controller 26 transmits the warning email etc. to both the first mobile phone 28 and the second mobile phone 30 at the same time (step S17) after the first predetermined period of time has elapsed from initially detecting the situation requiring attention without the situation requiring attention being resolved (step S12=YES, step S14=YES).

Thus the warning email etc. is transmitted at the same time to the first mobile phone 28 and the second mobile phone 30 after the first predetermined period of time has elapsed since initial detection of the situation requiring attention. This configuration is adopted to achieve a swift resolution of the situation requiring attention even if one or other of the owners of the first mobile phone 28 or the second mobile phone 30 is unable to respond.

Third Variation

Figure 5:
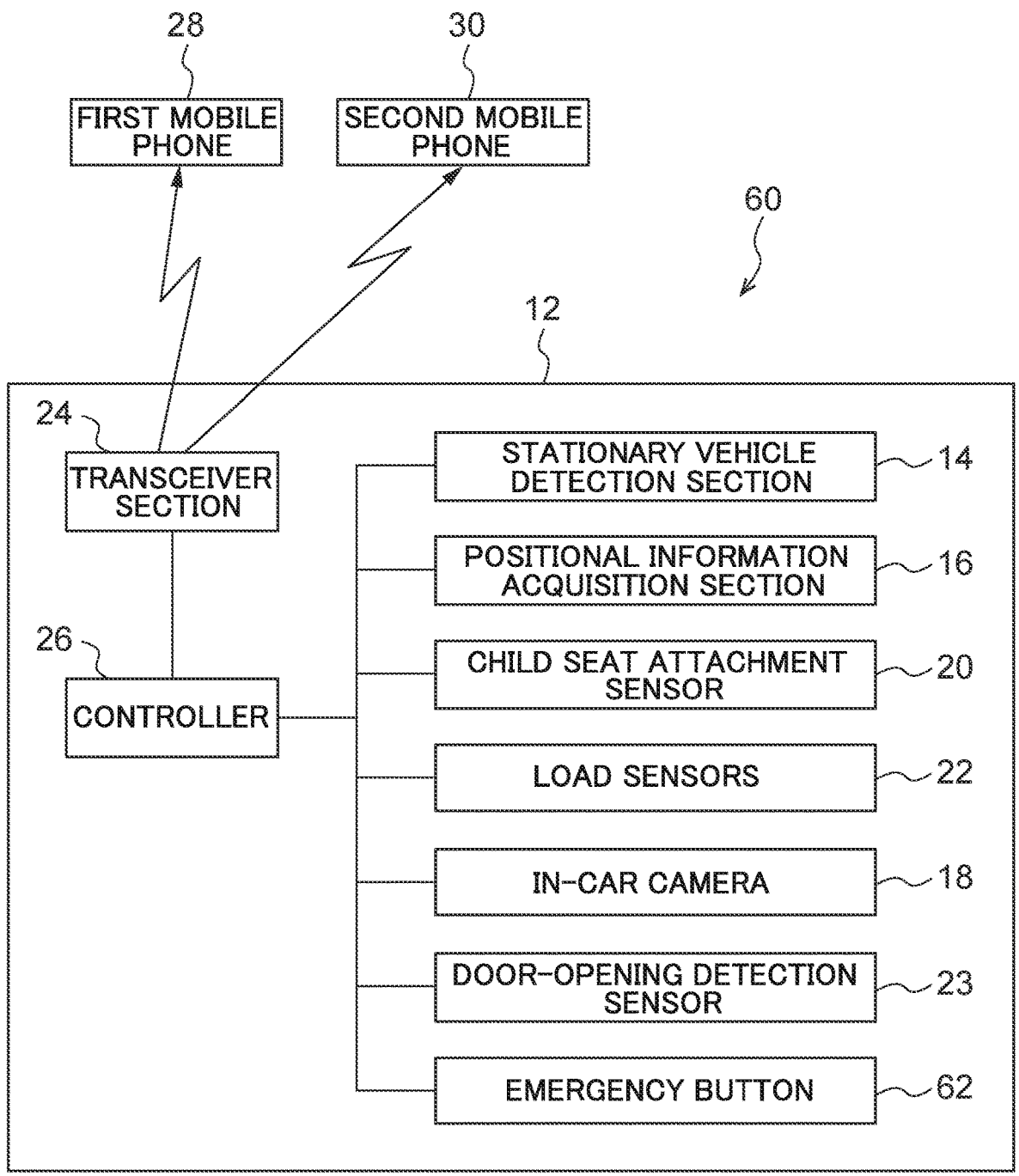
FIG. 5 is a block diagram illustrating an in-car status notification system according to a third variation of the first exemplary embodiment.

An in-car status notification system 60 according to a third variation of the first exemplary embodiment will now be described, with reference to FIG. 2, FIG. 5 and FIG. 6. The in-car status notification system 60 is configured by adding an emergency button 62 to the in-car status notification system 10. Configuration elements similar to those of the first exemplary embodiment and the first and second variations of the first exemplary embodiment are appended with the same reference numerals, and detailed explanation thereof will be omitted.

The emergency button 62 is, for example, installed inside the vehicle on the door trim of rear seats or the front seat (front passenger seat), and is configured to input a press signal to the controller 26 when the emergency button 62 is pressed.

Figure 2:
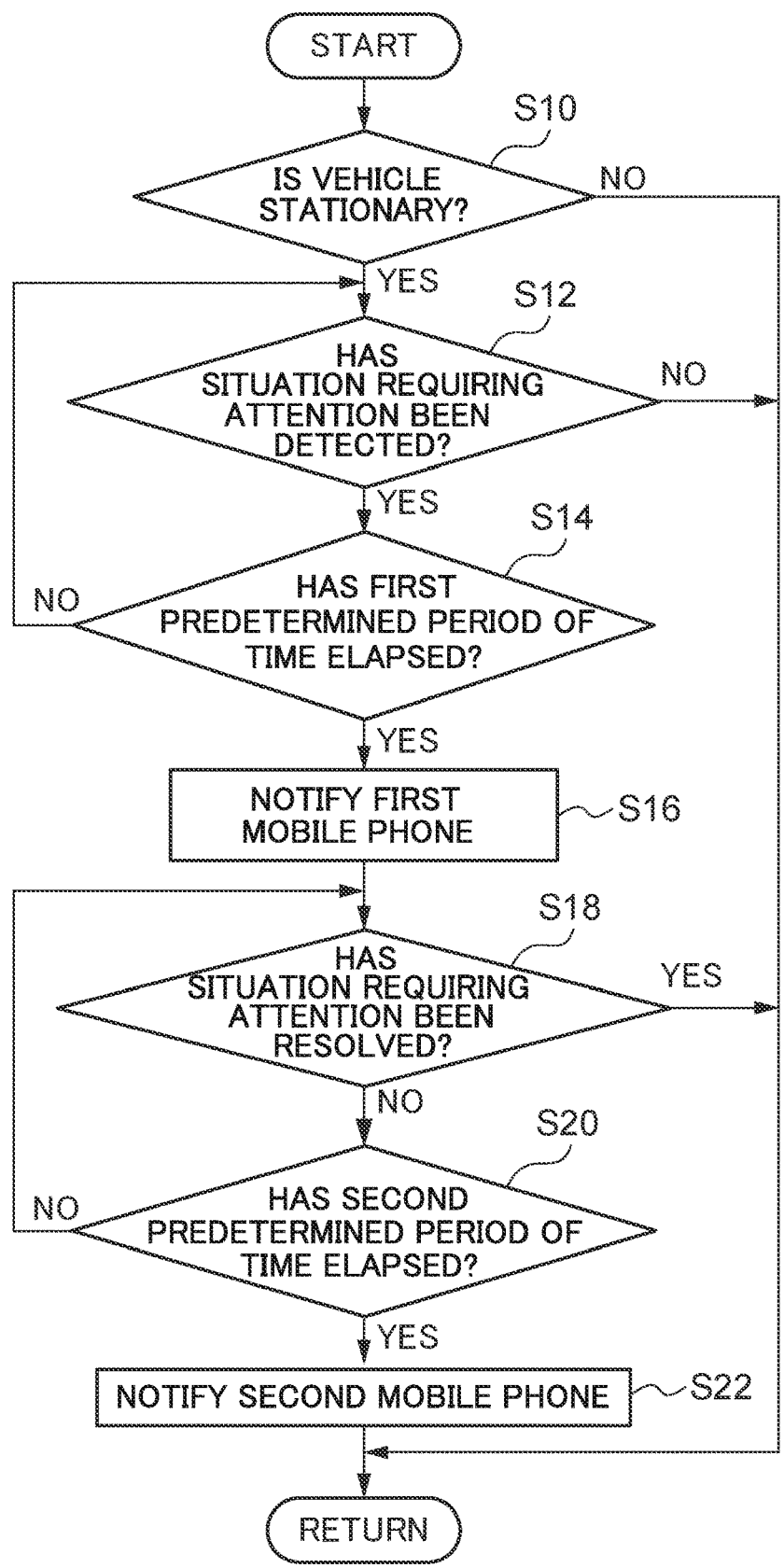
FIG. 2 is a flowchart illustrating in-car status notification processing in an in-car status notification system according to the first exemplary embodiment.

The in-car status notification system 60 performs in-car status notification processing similar to that of the in-car status notification system 10 (see FIG. 2). When input with the press signal from the emergency button 62, the controller 26 halts normal processing (see FIG. 2), and performs the following interrupt processing.

Figure 6:
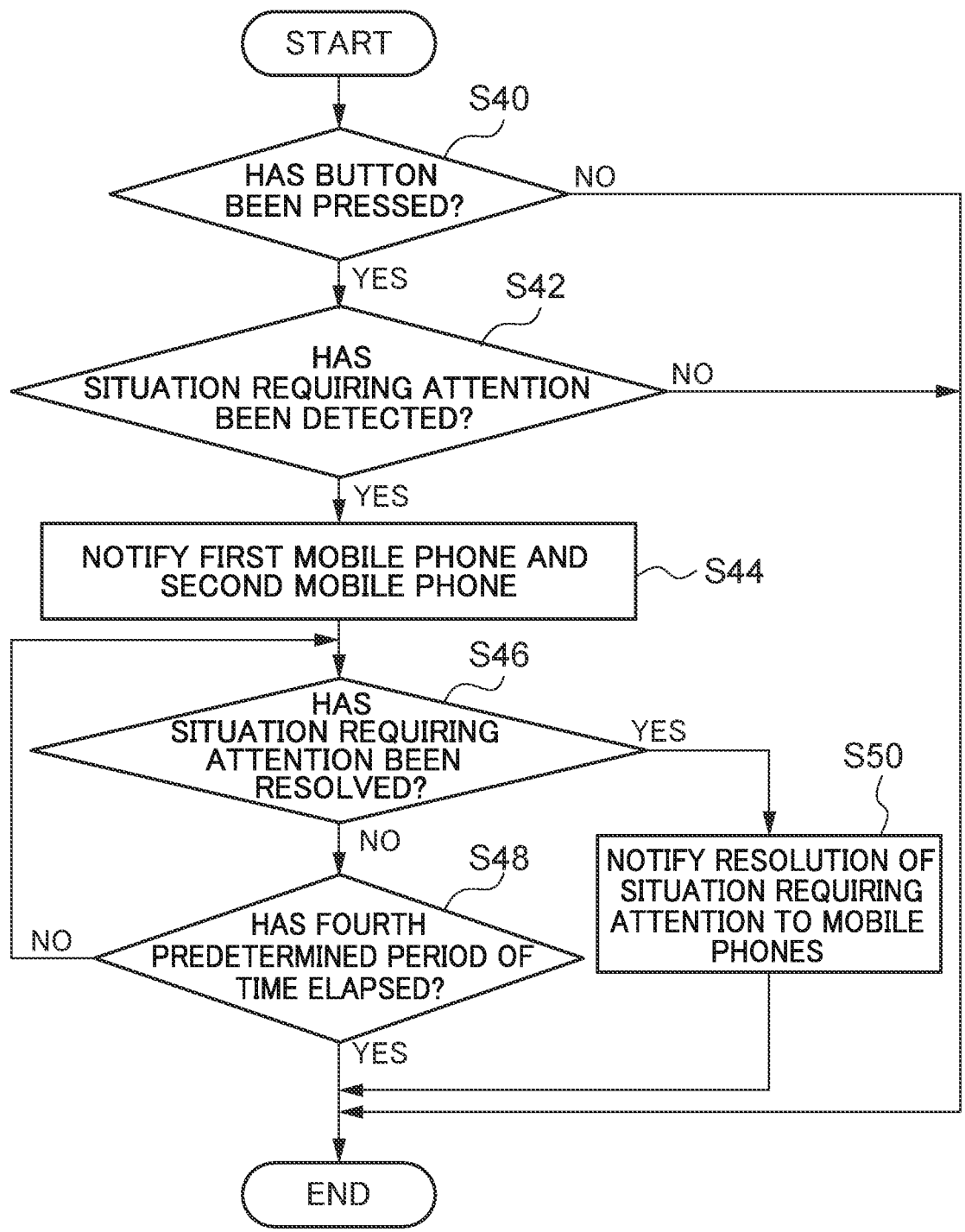
FIG. 6 is a flowchart illustrating in-car status notification processing of an in-car status notification system according to the third variation of the first exemplary embodiment.

Namely, as illustrated in FIG. 6, when the press signal is input to the controller 26 (step S40=YES), the controller 26 determines whether or not there is an in-car situation requiring attention (step S42).

The controller 26 ends the interrupt processing when it has determined that there is no situation requiring attention (step S42=NO). This is because it is surmised that a child did not press the emergency button 62 to call for help, but the emergency button 62 had been pushed unintentionally, or out of mischief.

However, when determined that there is a situation requiring attention (step S42=YES), the controller 26 immediately sends a warning email etc. from the transceiver section 24 to the first mobile phone 28 and the second mobile phone 30 (step S44). This is because there is a high probability that the child intentionally pressed the emergency button 62 themselves, and the child themselves wants the situation requiring attention to be resolved (is calling for help).

As illustrated in FIG. 6, the controller 26 checks whether or not the situation requiring attention has been resolved (step S46, step S48=NO) before a fourth predetermined period of time has elapsed from when the warning email was transmitted to the first mobile phone 28 and the second mobile phone 30 (step S44).

The controller 26 transmits a resolution notification email notifying resolution of the situation requiring attention from the transceiver section 24 to the first mobile phone 28 and the second mobile phone 30 (step S50) in cases in which it has determined that the situation requiring attention has been resolved prior to elapse of the fourth predetermined period of time (step S46=YES). Note that as described for the first variation of the first exemplary embodiment, a configuration may be adopted in which the resolution notification email is only transmitted to the mobile phone of the party who did not contribute to the resolution of the situation requiring attention.

However, in cases in which the fourth predetermined period of time has elapsed without resolution of the situation requiring attention, the interrupt processing is ended (step S46=NO, step S48=YES).

Adopting such a configuration for the in-car status notification system 50 enables a child inside the automobile 12 to call for external help, and also aims to achieve a swift and certain resolution to the situation requiring attention.

Second Exemplary Embodiment

Explanation follows regarding an in-car status notification system according to a second exemplary embodiment of the present disclosure, with reference to FIG. 7 to FIG. 12. Each of the drawings is merely a schematic representation, and elements having a low relationship to the present exemplary embodiment are omitted from illustration. Configuration elements similar to those of the first exemplary embodiment are appended with the same reference numerals, and detailed explanation thereof will be omitted.

Configuration

An in-car status notification system 70 is configured similarly to the in-car status notification system 10 of the first exemplary embodiment.

The transmission destinations for warning emails preregistered (pre-stored) in the controller 26 include a predetermined organization, for example a car company service center 72, in addition to the first mobile phone 28 and the second mobile phone 30.

Operation and Advantageous Effects

The in-car status notification processing of the in-car status notification system 70 is substantially the same as that of the first variation of the first exemplary embodiment. However, after transmitting the warning email to the second mobile phone 30 (step S22), the controller 26 then transmits a warning email stating that the automobile 12 has a situation requiring attention to the predetermined organization, such as the car company service center 72, (step S30) in cases in which the situation requiring attention has not been resolved before the third predetermined period of time has elapsed (step S24=NO, step S26=YES).

The service center 72 that has received the warning email accordingly contacts the owner or the like of the automobile to request a response, and when not able to contact the owner of the automobile, contacts a security company or a predetermined public organization (the police, for example) to get someone dispatched to the automobile so as to achieve a resolution of the situation requiring attention.

The probability of achieving a swift and certain resolution to the situation requiring attention is thereby raised in the in-car status notification system 70 by transmitting the warning email to the first mobile phone 28 and the second mobile phone 30. Moreover, in cases in which the situation requiring attention has still not been resolved within the predetermined period of time, the warning email notification is sent to the predetermined organization (e.g. the car company service center 72). The car company service center 72 is thereby made aware that the automobile 12 has a situation requiring attention, and is able to expedite resolution of the situation requiring attention by contacting the owner of the automobile 12 or the like. A security company or a public organization (the police) or the like can also be contacted in cases in which no contact can be made with the owner of the automobile 12, or cases in which there is only a half-hearted response to resolve the situation requiring attention, thereby enabling the situation requiring attention to be resolved. Namely, this enables more certainty that resolution of the situation requiring attention will be achieved.

First Variation

Figure 7:
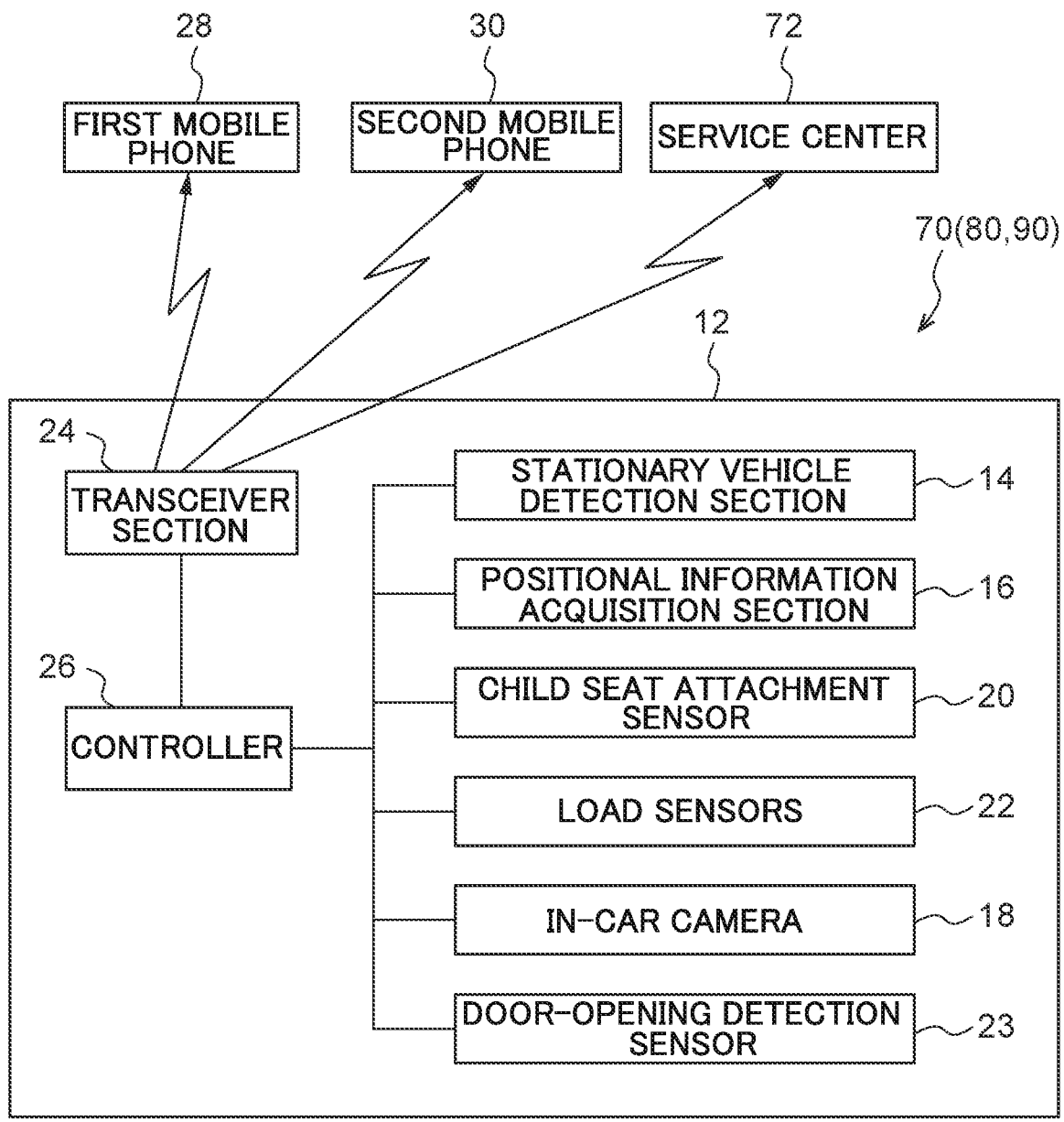
FIG. 7 is a block diagram illustrating an in-car status notification system according to a second exemplary embodiment.
Figure 8:
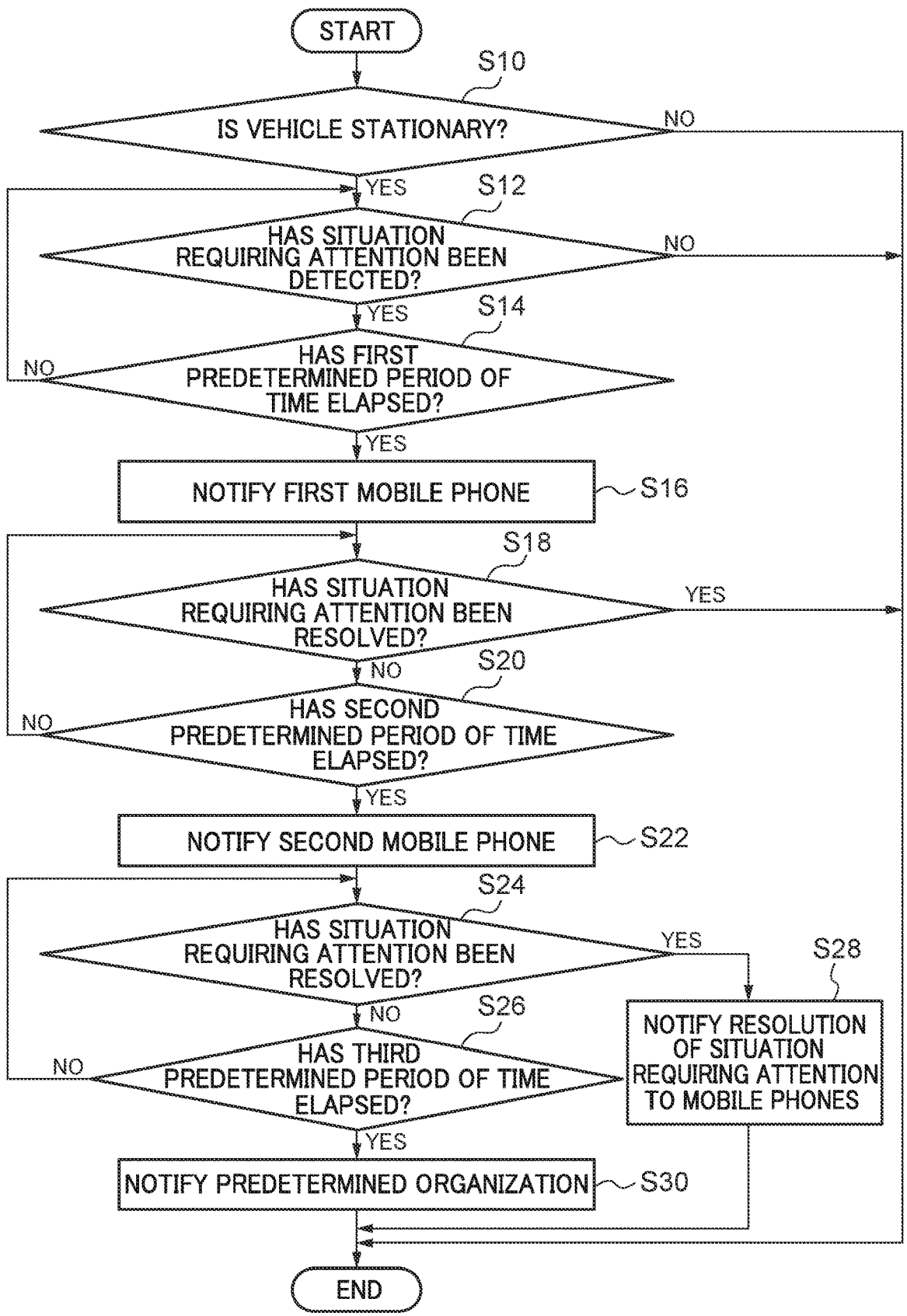
FIG. 8 is a flowchart illustrating in-car status notification processing of an in-car status notification system according toward the second exemplary embodiment.
Figure 9:
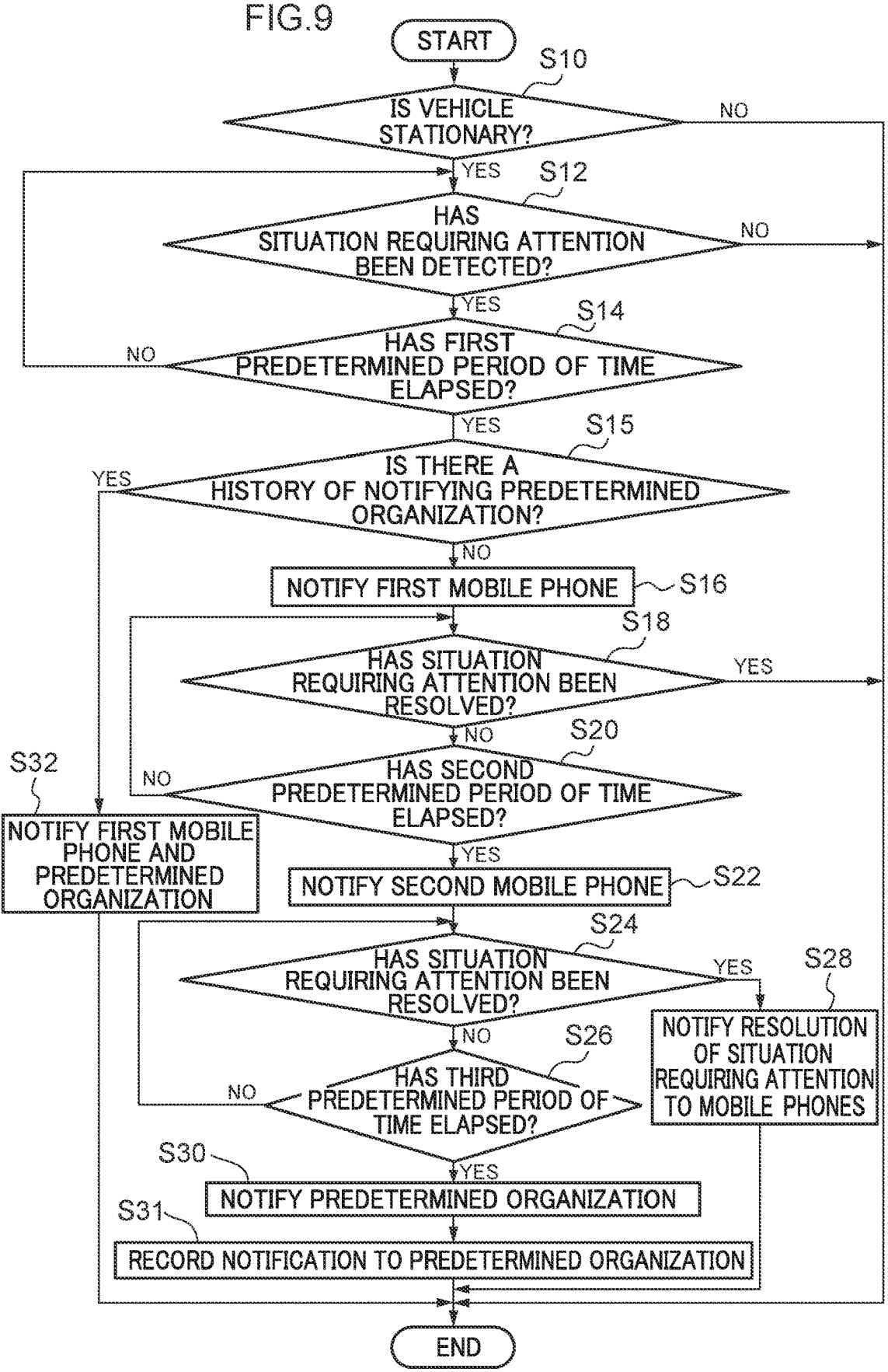
FIG. 9 is a flowchart illustrating in-car status notification processing of an in-car status notification system according to a first variation of the second exemplary embodiment.

Description follows regarding an in-car status notification system 80 according to a first variation of the second exemplary embodiment, with reference to FIG. 9. The in-car status notification system 80 is, as illustrated in FIG. 7, configured exactly the same as the in-car status notification system 70, except that in the in-car status notification processing, the first mobile phone 28 and the car company service center 72 are notified by warning email at the same time when the car company service center 72 has on a previous occasion been notified by warning email. Configuration elements similar to those of the second exemplary embodiment are appended with the same reference numerals, and detailed explanation thereof will be omitted.

When the first predetermined period of time has elapsed since initial detection of the situation requiring attention without resolution of the situation requiring attention (step S12, step S14=YES), the controller 26 of the in-car status notification system 80 checks whether or not there is any record of transmission of a warning email to the predetermined organization (e.g. the service center 72) on a previous occasion (step S15).

The controller 26 then proceeds to perform in-car status notification processing (step S16 to step S30) similar to that of the second exemplary embodiment in cases in which there is no record of a warning email etc. having been sent to the service center 72 on a previous occasion. When a warning email has been sent from the transceiver section 24 to the predetermined organization, for example the service center 72 (step S30), the controller 26 records the sending of notification (transmission of the warning email) to the predetermined organization (step S31).

However, in cases in which a warning email has been sent to the service center 72 on a previous occasion (step S15=YES), the controller 26 sends warning emails etc. to both the first mobile phone 28 and the service center 72 at the same time (step S32).

Notification having been sent (warning email etc. transmission) to the service center 72 on a previous occasion means that the owners of both the first mobile phone 28 and the second mobile phone 30 did not swiftly resolved the situation requiring attention. Namely, there is a concern that the owners of both the first mobile phone 28 and the second mobile phone 30 might not swiftly resolved the situation requiring attention this time too.

Transmitting the warning email also to the service center 72 at the timing the warning email is initially transmitted to the first mobile phone 28 enables a swift and certain resolution to be achieved to the situation requiring attention.

Second Variation

Figure 10:
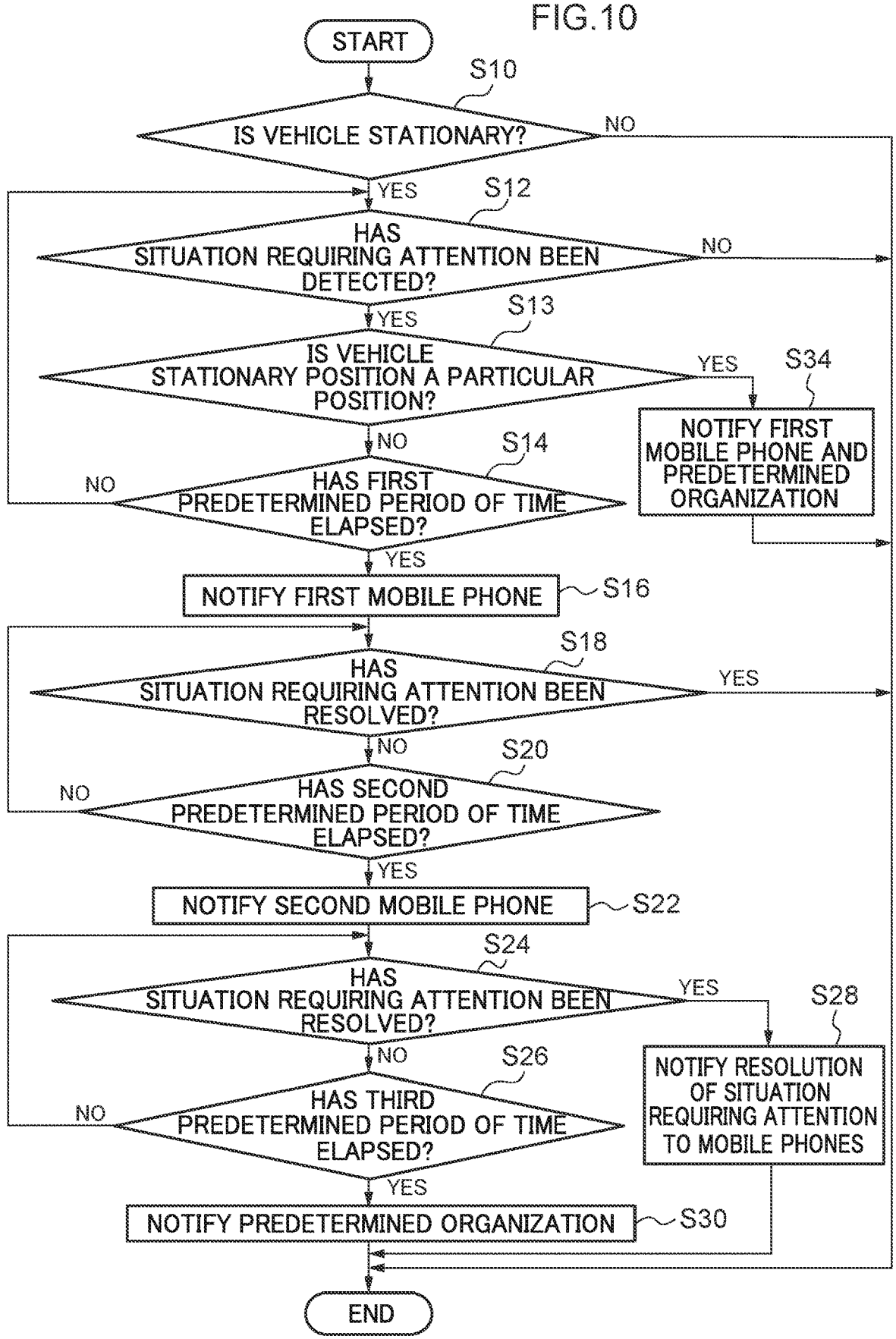
FIG. 10 is a flowchart illustrating in-car status notification processing of an in-car status notification system according to a second variation of the second exemplary embodiment.

Description follows regarding an in-car status notification system 90 according to a second variation of the second exemplary embodiment, with reference to FIG. 10. The in-car status notification system 90 is, as illustrated in FIG.

7, configured exactly the same as the in-car status notification system 70, except in that locations (positional information) of amusement arcades or the like are stored (recorded) in the controller 26.

When a situation requiring attention has been detected (step S12=YES), the controller 26 of the in-car status notification system 90 determines whether or not positional information of the automobile 12 matches any stored positional information of amusement arcades (step S13).

In cases in which there is no match between the positional information of the automobile 12 and the positional information of amusement arcades (step S13=NO), the controller 26 performs in-car status notification processing similar to that of the second exemplary embodiment (step S14 to step S30).

However, when there is a match between the positional information of the automobile 12 and the positional information of amusement arcades (step S13=YES), the controller 26 immediately sends warning emails etc. to the first mobile phone 28 and the service center 72 (step S34).

This approach is adopted because there is a concern that warning emails might not be looked at by the owner of the first mobile phone 28, i.e. the presumed driver, or that the owner might not respond to resolve the situation requiring attention, if the owner had already become engrossed by play in the amusement arcade. Thus in cases in which a situation requiring attention has been detected, a warning email is immediately sent to the first mobile phone 28, so as to issue a warning and prompt resolution of the situation requiring attention before the owner of the first mobile phone 28 has started play in the amusement arcade.

Moreover, since a driver who has already entered the amusement arcade might not even look at the first mobile phone 28 (might not respond to resolve the situation requiring attention), the service center 72 is notified immediately so that a proper response can be expected.

Thus in the in-car status notification system 80, in cases in which there is a match between the information for the stationary position of the automobile 12 when the situation requiring attention was detected and pre-stored amusement arcade positional information, a resolution to the situation requiring attention can be achieved in a parking lot or the like of an amusement arcade by transmitting warning emails immediately to both the first mobile phone 28 and the service center 72.

Third Variation

Figure 11:
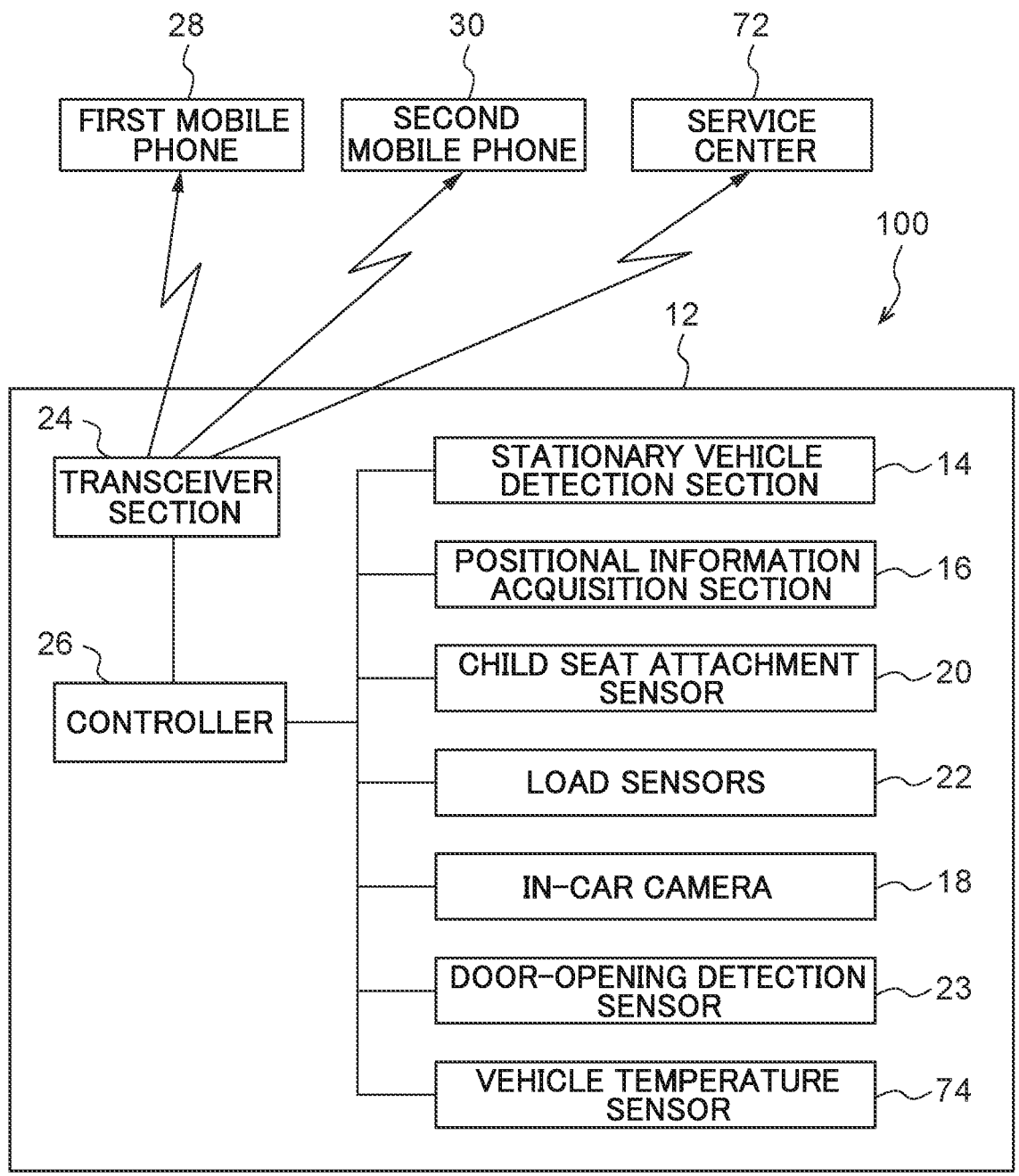
FIG. 11 is a block diagram illustrating an in-car status notification system according to a third variation of the second exemplary embodiment.
Figure 12:
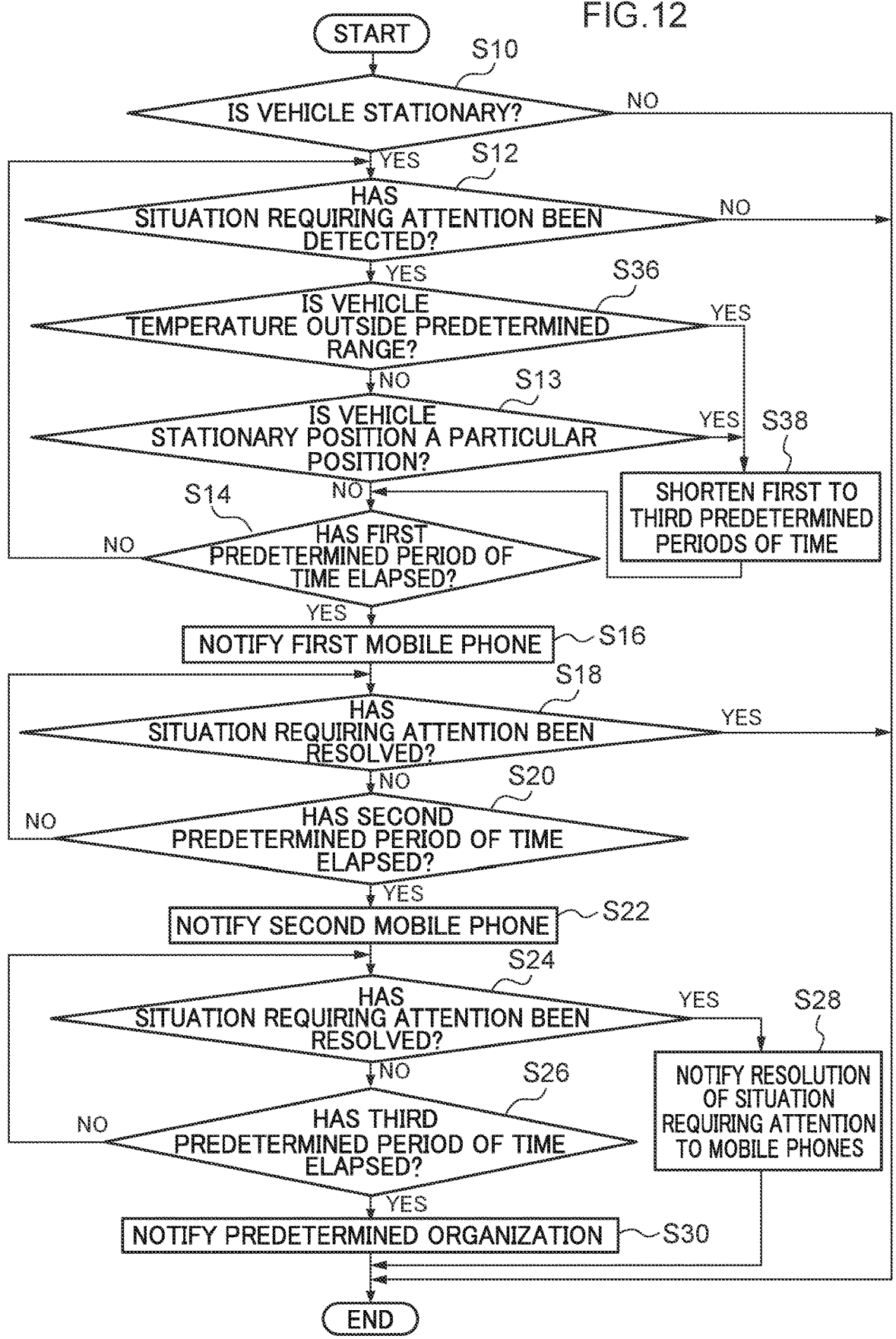
FIG. 12 is a flowchart illustrating in-car status notification processing of an in-car status notification system according to the third variation of the second exemplary embodiment.

Description follows regarding an in-car status notification system 100 according to a third variation of the second exemplary embodiment, with reference to FIG. 11 and FIG. 12. As illustrated in FIG. 11, the configuration of the in-car status notification system 100 differs from that of the in-car status notification system 70 by the addition of a vehicle temperature sensor 74 for detecting the vehicle internal (in-car) temperature of the automobile 12. Another difference is that the locations (positional information) of amusement arcades and a predetermined range for the in-car temperature are also stored in the controller 26.

In the in-car status notification system 100 configured in this manner, as illustrated in FIG. 12, when a situation requiring attention has been detected (step S12=YES), the controller 26 determines whether or not the in-car temperature detected by the vehicle temperature sensor 74 lies outside the predetermined range (step S36). The controller 26 shortens settings for the first to third predetermined periods (step S38) for cases in which the in-car temperature lies outside the predetermined range (step S36=YES).

This approach is adopted because if the in-car temperature is greater than the predetermined range then the in-car temperature is too high, and there is determined to be a possibility that a child inside the vehicle will suffer from heatstroke or the like. If the in-car temperature is lower than the predetermined range then the in-car temperature is too low, and there is determined to be a possibility that a child inside the vehicle will catch a cold or suffer from hypothermia or the like. In such cases, the periods of time before notifying the first mobile phone 28, the second mobile phone 30, and the service center 72 are shortened so as to achieve even swifter resolution of the situation requiring attention.

Note that in cases in which the in-car temperature lies within the predetermined range (step S36=YES), this is followed by determination as to whether or not there is a match between the stationary position of the vehicle and an amusement arcade location (position) (step S13). The controller 26 also shortens the settings for the first to third predetermined periods of time (step S38) in cases in which there is a match between the positional information of the automobile 12 and positional information of an amusement arcade (step S13=YES).

This approach is adopted because if the presumed driver, i.e. the owner of the first mobile phone 28, has become engrossed in play in the amusement arcade, then the warning email might be overlooked, or the owner of the first mobile phone 28 might not address resolution of the situation requiring attention. Thus in cases in which a situation requiring attention has been detected, the first predetermined period of time before sending the warning email to the first mobile phone 28 is shortened so as to notify the owner and to prompt resolution of the situation requiring attention before the owner starts play in the amusement arcade. Moreover, the second and third predetermined periods of time before notifying the second mobile phone 30 and the service center 72 are also shortened in consideration of the high possibility of the owner of the first mobile phone 28 being engrossed in play and not responding.

Note that in-car status notification processing similar to that of the second exemplary embodiment (step S14 to step S30) is performed in cases in which there is no match between the stationary position of the automobile 12 and the stored positions of amusement arcade etc.

In the in-car status notification system 100, the first to third predetermined periods of time, which are the waiting times until notifying the first mobile phone 28, the second mobile phone 30, and the service center 72, are shortened in cases in which the in-car temperature is outside the predetermined range, thereby achieving a swift resolution of the situation requiring attention and enabling a deterioration in the physical condition of a child inside the automobile 12 to be suppressed.

Moreover, in the in-car status notification system 100, shortening the first to third predetermined periods of time for waiting before notifying the first mobile phone 28, the second mobile phone 30, and the service center 72 in cases in which there is a match between the stationary position of the automobile 12 and an amusement arcade position aims to achieve resolution of the situation requiring attention by sending a warning email to the presumed driver, i.e. the owner of the first mobile phone 28, prior to the owner becoming engrossed in play. Shortening the periods of time before notifying the second mobile phone 30 and the service center 72 aims to achieve a swift resolution of the situation requiring attention in cases in which the owner of the first mobile phone 28 does not respond to resolve the situation requiring attention.

Other

Although the above series of exemplary embodiments are configured to notify two mobile phones, i.e. the first mobile phone 28 and the second mobile phone 30, a configuration may be adopted in which plural mobile phones numbering three or more are notified. In such cases, configurations may be adopted in which the plural mobile phones are notified at the same time as each other, or in which the plural mobile phones are notified in sequence at predetermined time intervals.

Although examples are given of situation requiring attention detection sections that perform determinations using pattern matching based on imaging data of the in-car camera 18, and/or that perform determinations from whether or not a child seat is attached using child seat attachment sensors and from load values for each of the vehicle seats, there is no limitation to such configurations. There are no particular limitations, as long as the configuration is capable of determining the presence of a child alone in a vehicle from image data of an in-car camera and/or detection values of various sensors.

Moreover, although a configuration has been described in which it is the service center 72 that is notified when the situation requiring attention has not been resolved even though there has been mobile phone notification, there is no limitation to the type of organization as long as it is a predetermined organization for resolving the situation requiring attention. A public organization such as the police may be employed therefor, or an organization capable of dispatching personnel to the vehicle such as a security company may be employed therefor.

Moreover, although the third variation of the first exemplary embodiment is configured so as to notify the first mobile phone 28 and the second mobile phone 30 when the emergency button 62 had been pressed, a configuration may be adopted in which a predetermined organization, such the service center 72 for example, is also notified at the same time.

Furthermore, although in the first and second variations of the second exemplary embodiment, the first mobile phone 28 and the service center 72 are notified, the second mobile phone 30 may also be notified.

An object of the present disclosure is to provide an in-car status notification system that achieves a swift and certain resolution of a situation in which a child is alone inside an automobile.

A first aspect of the present disclosure is an in-car status notification system, that includes: a memory, and a processor that is configured to: detect that a situation requiring attention has arisen in which a child is alone inside an automobile by using at least one of a plurality of sensors or a camera; detect positional information of the automobile; and in cases in which the situation requiring attention has been detected, send notification of the automobile positional information and situation requiring attention detected information indicating a child is alone in the automobile to at least a pre-set first mobile phone and a pre-set second mobile phone.

According to an in-car status notification system of such a configuration, in cases in which a child is detected as being alone inside an automobile by the situation requiring attention detection section, the automobile positional information and situation requiring attention detected information (referred to below as the "situation requiring attention detected information etc.") is notified to the pre-set first mobile phone and the pre-set second mobile phone by the notification section.

This enables the owner of the first mobile phone (e.g. the driver) and the owner of the second mobile phone (e.g. a relative of the driver) and the like to be made aware of the child being alone inside the automobile (referred to below as the "situation requiring attention"). For example, even if one or other of the owners of the first mobile phone or the second mobile phone has not noticed the notification and not responded (is unable to respond), the other owner can still respond so as to resolve the situation requiring attention. Moreover, a person other than the person who stopped the automobile is able to go to the automobile due to the automobile positional information being attached.

A second aspect of the present disclosure is the in-car status notification system of the first aspect, wherein the processor is further configured to: detect the automobile being stationary; and in cases in which the automobile being stationary has been detected and the situation requiring attention has been detected, send notification of the situation requiring attention detected information and the automobile positional information to the first mobile phone and to the second mobile phone.

According to an in-car status notification system configured in this manner, in cases in which the automobile has been detected as stationary by the stationary vehicle detection section and the child has been detected as being alone inside the automobile by the situation requiring attention detection section, the situation requiring attention detected information etc. are notified to the pre-set first mobile phone and to the pre-set second mobile phone by the notification section.

Therein determination as to whether or not a situation requiring attention has arisen is performed only in cases in which the automobile is stationary, enabling determination of the situation requiring attention to be performed efficiently.

A third aspect of the present disclosure is the in-car status notification system of the first or the second aspect, wherein the processor is configured to: send notification of the automobile positional information and the situation requiring attention detected information to the first mobile phone, in cases in which the situation requiring attention has not been resolved after a first predetermined period of time from when the situation requiring attention was detected; and send notification of the automobile positional information and the situation requiring attention detected information to the second mobile phone, in cases in which the situation requiring attention has not been resolved after a second predetermined period of time from when notification of the automobile positional information and the situation requiring attention detected information was sent to the first mobile phone.

According to such a configuration of in-car status notification system, the situation requiring attention detected information etc. are notified to the first mobile phone by the notification section in cases in which the situation requiring attention has not been resolved before elapse of the first predetermined period of time from when the situation requiring attention was detected. Moreover, the situation requiring attention detected information etc. are notified to the second mobile phone by the notification section in cases in which the situation requiring attention has not been resolved before elapse of the second predetermined period of time from notifying the first mobile phone.

Namely, the notification section does not notify either mobile phone until elapse of the first predetermined period of time from when the situation requiring attention was detected. This approach is adopted in order to avoid the hassle that would arise if the mobile phones were notified even though the driver or the like was only away using the toilet, or the like, and the situation requiring attention was resolved in a short period of time.

Moreover, the situation requiring attention detected information etc. are not notified to the second mobile phone until elapse of the second predetermined period of time from when the situation requiring attention detected information was notified to the first mobile phone. This approach is adopted in consideration that due to receiving the situation requiring attention detected information etc., the owner of the first mobile phone might go to the automobile and resolve the situation requiring attention, or might contact a third party and get the third party to resolve the situation requiring attention. Namely, this is a configuration that avoids the situation requiring attention detected information etc. being notified to the second mobile phone even though the situation requiring attention has already been resolved.

A fourth aspect of the present disclosure is the in-car status notification system of any one of the first to the third aspects, wherein the processor is configured to: in cases in which the situation requiring attention has been resolved after sending notification of the automobile positional information and the situation requiring attention detected information to the first mobile phone and the second mobile phone, send notification of resolution of the situation requiring attention to at least a mobile phone not contributing to resolution of the situation requiring attention, from among the first mobile phone and the second mobile phone.

According to an in-car status notification system of such a configuration, in cases in which the situation requiring attention has been resolved after the situation requiring attention detected information etc. has been transmitted to the first mobile phone and the second mobile phone by the notification section, resolution of the situation requiring attention is notified by the notification section to at least the mobile phone not contributing to resolution of the situation requiring attention.

Thus actions can be avoided from being taken to resolve the situation requiring attention even though the situation requiring attention has been resolved by the owner of one or other of the first mobile phone or the second mobile phone.

A fifth aspect of the present disclosure is the in-car status notification system of the first, the second, or the fourth aspect, wherein the processor is configured to: send notification of the automobile positional information and the situation requiring attention detected information to a predetermined organization, in cases in which the situation requiring attention has not been resolved after a third predetermined period of time from when notification of the automobile positional information and the situation requiring attention detected information was sent to the second mobile phone.

In an in-car status notification system configured in this manner, the situation requiring attention detected information etc. are notified to the predetermined organization by the notification section in cases in which the situation requiring attention has not been resolved before elapse of the third predetermined period of time from when the situation requiring attention detected information etc. were notified to the second mobile phone. Namely, in cases in which the situation requiring attention has not been resolved even though a predetermined period of time has elapsed from when the situation requiring attention detected information etc. was notified to the first mobile phone and the second mobile phone, this is determined as being because the owners of the first mobile phone and the second mobile phone have either not noticed the notification, or are not in a position to respond. The situation requiring attention detected information etc. are accordingly notified to the predetermined organization. This enables an appropriate response to be taken by the predetermined organization and the situation requiring attention to be resolved.

A sixth aspect of the present disclosure is the in-car status notification system of the fifth aspect depending from the third aspect, wherein the processor is configured to: in a case in which the notification has been sent to the predetermined organization, record the notification to the predetermined organization, and in cases in which there is a record of a previous notification to the predetermined organization in a case in which the situation requiring attention is detected, send notification of the automobile positional information and the situation requiring attention detected information to the first mobile phone and to the predetermined organization after the first predetermined period of time elapses.

In an in-car status notification system configured in this manner, the notification section records notification when the predetermined organization has been notified. Moreover, in cases in which there is a record of previous notification to the predetermined organization, the situation requiring attention detected information etc. are notified by the notification section to both the first mobile phone and the predetermined organization at the elapse timing of the first predetermined period of time from when the situation requiring attention was detected.

This is because the fact that the predetermined organization was notified by the notification section on a previous occasion means that on that occasion the owners of the first mobile phone and the second mobile phone did not respond (were not able to respond) within the predetermined periods of time. This is accordingly determined to mean that there is a possibility that this time there will similarly not be a resolution of the situation requiring attention within the predetermined period of time. Therefore, together with the first mobile phone, the predetermined organization is also notified with the situation requiring attention detected information etc. in order to achieve as fast a resolution to the situation requiring attention as possible.

A seventh aspect of the present disclosure is the in-car status notification system of the fifth aspect depending from the third aspect, wherein the processor is configured to: detect an in-car temperature by using a vehicle temperature sensor; and shorten the first to the third predetermined periods of time in cases in which the in-car temperature lies outside a predetermined temperature range in a case in which the situation requiring attention is detected.

In cases in which the in-car temperature detected by the in-car temperature detection section lies outside the predetermined temperature range, the timings (the first to the third predetermined periods of time) after detecting the situation requiring attention for notifying the situation requiring attention detected information etc. to the first mobile phone, the second mobile phone, and the predetermined organization are shortened.

This enables a child to be prevented or suppressed from getting heatstroke when inside a vehicle having too high an in-car temperature, or from freezing when the in-car temperature is too cold. In particular the time until notification to the predetermined organization is shortened so as to achieve as speedy resolution of the situation requiring attention as possible.

An eighth aspect of the present disclosure is the in-car status notification system of the fifth aspect depending from the third aspect, wherein the processor is configured to: in a case in which the notification has been sent to the predetermined organization, record the notification to the predetermined organization, and shorten the first to the third predetermined periods of time in cases in which there is a record of a previous notification to the predetermined organization in a case in which the situation requiring attention is detected.

In cases in which the notification section has notified the predetermined organization on a previous occasion, the timings (the first to the third predetermined periods of time) after detecting the situation requiring attention for notifying the situation requiring attention detected information etc. to the first mobile phone, the second mobile phone, and the predetermined organization are shortened.

The fact that the notification section has notified the predetermined organization on a previous occasion means that on that occasion the owners of the first mobile phone and the second mobile phone did not respond (were not able to respond) within the predetermined periods of time. Thus similarly this time, even in cases in which a resolution of the situation requiring attention is not achieved within the predetermined periods of time (the first to the third predetermined periods of time), the time until notifying the predetermined organization has been shortened, so as to achieve a swift and certain resolution to the situation requiring attention.

A ninth aspect of the present disclosure is the in-car status notification system of any one of the first to the eighth aspects, further comprising an emergency button inside the vehicle cabin, wherein the processor is configured to: in cases in which pressing of the emergency button has been detected, send notification of the automobile positional information and the situation requiring attention detected information to the first mobile phone and the second mobile phone immediately after the situation requiring attention is confirmed.

In the in-car status notification system configured in this manner, the emergency button is provided inside the vehicle cabin. In cases in which the emergency button has been pressed and the situation requiring attention confirmed, the situation requiring attention detected information etc. are notified to the first mobile phone and the second mobile phone immediately. Namely, situations in which children alone in a vehicle have operated the emergency button are determined to be emergencies, and the situation requiring attention detected information etc. are immediately notified to the first mobile phone and the second mobile phone.

A tenth aspect of the present disclosure is the in-car status notification system of the ninth aspect, wherein the processor is configured to: in cases in which pressing of the emergency button has been detected, send notification of the automobile positional information and the situation requiring attention detected information to a predetermined organization immediately after the situation requiring attention is confirmed.

According to an in-car status notification system configured in this manner, the situation requiring attention detected information etc. are immediately notified to the predetermined organization by the notification section if the emergency button provided in the vehicle cabin is operated and the situation requiring attention detected. This enables even more swift and certain resolution to be achieved of the situation requiring attention.

The in-car status notification system of the present disclosure enables swift and certain resolution to be achieved of the situation requiring attention.

What is claimed is:

1. An in-car status notification system, comprising: a memory, and a processor that is configured to:
   detect that a situation requiring attention has arisen in which a child is alone inside an automobile by using at least one of a plurality of sensors or a camera;
   detect positional information of the automobile;
   in cases in which the situation requiring attention has been detected, send notification of the automobile positional information and situation requiring attention detected information indicating a child is alone in the automobile to at least a pre-set first mobile phone and a pre-set second mobile phone;
   send notification of the automobile positional information and the situation requiring attention detected information to the first mobile phone, in cases in which the situation requiring attention has not been resolved after a first predetermined period of time from when the situation requiring attention was detected;
   send notification of the automobile positional information and the situation requiring attention detected information to the second mobile phone, in cases in which the situation requiring attention has not been resolved after a second predetermined period of time from when notification of the automobile positional information and the situation requiring attention detected information was sent to the first mobile phone;
   send notification of the automobile positional information and the situation requiring attention detected information to a predetermined organization, in cases in which the situation requiring attention has not been resolved after a third predetermined period of time from when notification of the automobile positional information and the situation requiring attention detected information was sent to the second mobile phone; and
   in a case in which the notification has been sent to the predetermined organization, record the notification to the predetermined organization, and shorten the first to the third predetermined periods of time in cases in which there is a record of a previous notification to the predetermined organization in a case in which the situation requiring attention is detected.

2. The in-car status notification system of claim 1, wherein the processor is further configured to:
   detect the automobile being stationary; and
   in cases in which the automobile being stationary has been detected and the situation requiring attention has been detected, send notification of the situation requiring attention detected information and the automobile positional information to the first mobile phone and to the second mobile phone.

3. The in-car status notification system of claim 1, wherein the processor is configured to:
   in cases in which the situation requiring attention has been resolved after sending notification of the automobile positional information and the situation requiring attention detected information to the first mobile phone and the second mobile phone, send notification of resolution of the situation requiring attention to at least a mobile phone not contributing to resolution of the situation requiring attention, from among the first mobile phone and the second mobile phone.

4. The in-car status notification system of claim 1, wherein the processor is configured to:
   in a case in which the notification has been sent to the predetermined organization, record the notification to the predetermined organization, and in cases in which there is a record of a previous notification to the predetermined organization in a case in which the situation requiring attention is detected, send notification of the automobile positional information and the situation requiring attention detected information to the first mobile phone and to the predetermined organization after the first predetermined period of time elapses.

5. The in-car status notification system of claim 1, wherein the processor is configured to:
   detect an in-car temperature by using a vehicle temperature sensor; and
   shorten the first to the third predetermined periods of time in cases in which the in-car temperature lies outside a predetermined temperature range in a case in which the situation requiring attention is detected.

6. The in-car status notification system of claim 1, further comprising an emergency button inside the vehicle cabin, wherein the processor is configured to:
   in cases in which pressing of the emergency button has been detected, send notification of the automobile positional information and the situation requiring attention detected information to the first mobile phone and the second mobile phone immediately after the situation requiring attention is confirmed.

7. The in-car status notification system of claim 6, wherein the processor is configured to:
   in cases in which pressing of the emergency button has been detected, send notification of the automobile positional information and the situation requiring attention detected information to a predetermined organization immediately after the situation requiring attention is confirmed.

8. An in-car status notification method comprising:
   by a processor, detecting that a situation requiring attention has arisen in which a child is alone inside an automobile by using at least one of a plurality of sensors or a camera;
   detecting positional information of the automobile;
   in cases in which the situation requiring attention has been detected, sending notification of the automobile positional information and situation requiring attention detected information indicating a child is alone in the automobile to at least a pre-set first mobile phone and a pre-set second mobile phone,
   wherein the processor is configured to:
   send notification of the automobile positional information and the situation requiring attention detected information to the first mobile phone, in cases in which the situation requiring attention has not been resolved after a first predetermined period of time from when the situation requiring attention was detected;
   send notification of the automobile positional information and the situation requiring attention detected information to the second mobile phone, in cases in which the situation requiring attention has not been resolved after a second predetermined period of time from when notification of the automobile positional information and the situation requiring attention detected information was sent to the first mobile phone;
   send notification of the automobile positional information and the situation requiring attention detected information to a predetermined organization, in cases in which the situation requiring attention has not been resolved after a third predetermined period of time from when notification of the automobile positional information and the situation requiring attention detected information was sent to the second mobile phone;
   record the notification to the predetermined organization, in a case in which the notification has been sent to the predetermined organization; and
   shorten the first to the third predetermined periods of time in cases in which there is a record of a previous notification to the predetermined organization in a case in which the situation requiring attention is detected.

9. The in-car status notification method of claim 8, further comprising:
   by the processor, detecting the automobile being stationary; and
   in cases in which the automobile being stationary has been detected and the situation requiring attention has been detected, sending notification of the situation requiring attention detected information and the automobile positional information to the first mobile phone and to the second mobile phone.

10. A non-transitory storage medium storing a program that is executable by a computer to perform an in-car status notification process, the in-car status notification process comprising:
   detecting a situation requiring attention in which a child is alone inside an automobile by using at least one of a plurality of sensors or a camera;
   detecting positional information of the automobile;
   in cases in which the situation requiring attention has been detected, sending notification of the automobile positional information and situation requiring attention detected information indicating a child is alone in the automobile to at least a pre-set first mobile phone and a pre-set second mobile phone,
   wherein the processor is configured to:
   send notification of the automobile positional information and the situation requiring attention detected information to the first mobile phone, in cases in which the situation requiring attention has not been resolved after a first predetermined period of time from when the situation requiring attention was detected;
   send notification of the automobile positional information and the situation requiring attention detected information to the second mobile phone, in cases in which the situation requiring attention has not been resolved after a second predetermined period of time from when notification of the automobile positional information and the situation requiring attention detected information was sent to the first mobile phone;
   send notification of the automobile positional information and the situation requiring attention detected information to a predetermined organization, in cases in which the situation requiring attention has not been resolved after a third predetermined period of time from when notification of the automobile positional information and the situation requiring attention detected information was sent to the second mobile phone;
   record the notification to the predetermined organization, in a case in which the notification has been sent to the predetermined organization; and
   shorten the first to the third predetermined periods of time in cases in which there is a record of a previous notification to the predetermined organization in a case in which the situation requiring attention is detected.

11. The non-transitory storage medium of claim 10, wherein the in-car status notification process further comprises:
   detecting the automobile being stationary; and
   in cases in which the automobile being stationary has been detected and the situation requiring attention has been detected, sending notification of the situation requiring attention detected information and the automobile positional information to the first mobile phone and to the second mobile phone.

12. An in-car status notification system, comprising: a memory, and a processor that is configured to:
   detect that a situation requiring attention has arisen in which a child is alone inside an automobile by using at least one of a plurality of sensors or a camera;
   detect positional information of the automobile;
   in cases in which the situation requiring attention has been detected, send notification of the automobile positional information and situation requiring attention detected information indicating a child is alone in the automobile to at least a pre-set mobile phone in which the situation requiring attention has not been resolved after a first predetermined period of time from when the situation requiring attention was detected; and
   send notification of the automobile positional information and the situation requiring attention detected information to a predetermined organization, in cases in which the situation requiring attention has not been resolved after a second predetermined period of time from when notification of the automobile positional information and the situation requiring attention detected information was sent to the first mobile phone; and
   in a case in which the notification has been sent to the predetermined organization, record the notification to the predetermined organization, and shorten the first and second predetermined periods of time in cases in which there is a record of a previous notification to the predetermined organization in a case in which the situation requiring attention is detected.

* * * * *

UNITED STATES PATENT AND TRADEMARK OFFICE
CERTIFICATE OF CORRECTION

PATENT NO. : 10,643,445 B2  
APPLICATION NO. : 16/229780  
DATED : May 5, 2020  
INVENTOR(S) : Keiko Nagatomi et al.

Page 1 of 1

It is certified that error appears in the above-identified patent and that said Letters Patent is hereby corrected as shown below:

On the Title Page

Item (72), inventor 1 city, delete "Toyota" and insert --Toyota-shi Aichi-ken--, therefor.

Item (72), inventor 2 city, delete "Anjo" and insert --Anjo-shi Aichi-ken--, therefor.

Item (72), inventor 3 city, delete "Nagoya" and insert --Nagoya-shi Aichi-ken--, therefor.

Item (72), inventor 4 city, delete "Okazaki" and insert --Okazaki-shi Aichi-ken--, therefor.

In the Specification

Column 6, Lines 2 & 3, delete "automobile automobile" and insert --automobile--, therefor.

Signed and Sealed this  
Twenty-third Day of June, 2020

Andrei Iancu  
*Director of the United States Patent and Trademark Office*